US010374935B2

(12) United States Patent
Lin

(10) Patent No.: US 10,374,935 B2
(45) Date of Patent: Aug. 6, 2019

(54) LINK DISCOVERY METHOD, SYSTEM, AND DEVICE

(71) Applicant: Huawei Technologies Co., Ltd., Shenzhen (CN)

(72) Inventor: Yi Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 15/166,896

(22) Filed: May 27, 2016

(65) Prior Publication Data
US 2016/0277279 A1 Sep. 22, 2016

Related U.S. Application Data

(63) Continuation of application No. PCT/CN2013/088226, filed on Nov. 29, 2013.

(51) Int. Cl.
| H04L 12/28 | (2006.01) |
| H04L 12/751 | (2013.01) |
| H04L 12/723 | (2013.01) |
| H04L 12/715 | (2013.01) |
| H04L 12/24 | (2006.01) |
| H04L 12/26 | (2006.01) |

(52) U.S. Cl.
CPC .............. *H04L 45/02* (2013.01); *H04L 41/12* (2013.01); *H04L 45/50* (2013.01); *H04L 45/64* (2013.01); *H04L 43/0811* (2013.01)

(58) Field of Classification Search
CPC ......... H04L 41/02; H04L 41/04; H04L 41/12; H04L 45/00; H04L 45/02; H04L 45/46; H04L 45/64; H04L 45/50

USPC .......................... 370/242, 254, 329, 392, 389
See application file for complete search history.

(56) References Cited

U.S. PATENT DOCUMENTS

| 9,130,870 B1* | 9/2015 | Swierk ..................... H04L 45/46 |
| 2007/0133568 A1 | 6/2007 | Qing et al. |
| 2012/0213224 A1 | 8/2012 | Chen |
| 2015/0055508 A1* | 2/2015 | Ashida ..................... H04L 41/04 370/254 |
| 2015/0334001 A1* | 11/2015 | Sato ........................ H04L 41/12 370/392 |

FOREIGN PATENT DOCUMENTS

| CN | 1571397 A | 1/2005 |
| CN | 101616061 A | 12/2009 |
| CN | 101656663 A | 2/2010 |

(Continued)

*Primary Examiner* — Harun Chowdhury

(57) ABSTRACT

The present invention provides a link discovery method. In the method, a first controller sends a first message to a first node, and the first node receives the first message, and sends the second link discovery packet from a first port to the second node; the second node receives the second link discovery packet at a second port, and sends a second message to the second controller according to the label, where the second message carries the second link discovery packet and an identifier of the second port; and the second controller receives the second message, extracts an identifier of the first port in the first link discovery packet and the identifier of the second port in the second message, and determines that a link exists between the first port of the first node and the second port of the second node.

12 Claims, 4 Drawing Sheets

(56) References Cited

FOREIGN PATENT DOCUMENTS

| | | | |
|---|---|---|---|
| CN | 101686197 | A | 3/2010 |
| CN | 102271079 | A | 12/2011 |
| WO | 2005/122493 | A1 | 12/2005 |
| WO | 2013/140803 | A1 | 9/2013 |

* cited by examiner

LINK DISCOVERY METHOD, SYSTEM, AND DEVICE

CROSS-REFERENCE TO RELATED APPLICATIONS

This application is a continuation of International Application No. PCT/CN2013/088226, filed Nov. 29, 2013, which is hereby incorporated by reference in its entirety.

TECHNICAL FIELD

The present invention relates to the field of communications, and in particular, to a link discovery method, system, and device.

BACKGROUND

A network of an operator is usually a multi-layer network. For example, a transport technology such as a Synchronous Digital Hierarchy (SDH), an Optical Transport Network (OTN), and Wavelength Division Multiplexing (WDM) may be used at a lower layer to build a transport network, to bear a packet switched network of a type such as the Internet Protocol (IP) and MPLS at an upper layer.

A multi-layer network may be controlled in a centralized manner. For example, a centralized transport network controller is introduced in a transport network, and the transport network controller implements network topology discovery, path computation, and path creation. In terms of path creation, the transport network controller may use, for example, the OpenFlow protocol to directly deliver a cross-connect creation command to each node through which a path passes. Meanwhile, a centralized routing controller is introduced at an IP/MPLS layer to schedule IP or MPLS streams in a centralized manner. During a link failure or link congestion at the IP or MPLS layer, the routing controller may further drive the transport network controller to create a new transport path, so as to generate a new logical link at the IP or MPLS layer.

To implement the foregoing multi-layer network management, the routing controller and the transport network controller both need to sense information about a cross-layer link in the network and perform control. In addition, the transport network at the lower layer further allows multiple upper-layer IP/MPLS routing domains to provide a transport service. Therefore, the transport network controller further needs to sense a routing domain to which the cross-layer link belongs at one end of an upper layer.

In the prior art, for each cross-layer link, a manual configuration method is used to configure information about the link on a routing controller and a transport network controller, where the information is, for example, identifier information of ports at two ends, and information about a routing domain to which the link belongs. However, because a quantity of cross-layer links is large, implementation is complex and reliability is low.

SUMMARY

An objective of the present invention is to provide a link discovery method, so as to solve a problem of how to enable a routing controller and a transport network controller to automatically discover information about a cross-layer link.

According to a first aspect, a link discovery method is provided, where the method includes:

sending, by a first controller, a first message to a first node, where the first message carries a first link discovery packet and a label corresponding to the first link discovery packet, the first link discovery packet includes an identifier of a first port, and the label is used for instructing a second node to send the first link discovery packet to a second controller;

receiving, by the first node, the first message, encapsulating the label at an outer layer of the first link discovery packet to form a second link discovery packet, and sending the second link discovery packet from the first port to the second node;

receiving, by the second node, the second link discovery packet at a second port, and sending a second message to the second controller according to the label, where the second message carries the second link discovery packet and an identifier of the second port; and receiving, by the second controller, the second message, popping the label of the second link discovery packet to obtain the first link discovery packet, extracting the identifier of the first port in the first link discovery packet and the identifier of the second port in the second message, and determining that a link exists between the first port of the first node and the second port of the second node.

With reference to the first aspect, in a first possible implementation manner of the first aspect, the receiving, by the first node, the first message, encapsulating the label at an outer layer of the first link discovery packet to form a second link discovery packet, and sending the second link discovery packet from the first port to the second node specifically includes:

receiving, by the first node, the first message, and creating a flow entry, where the flow entry includes at least: the identifier of the first port, the label, and a forwarding rule, and the forwarding rule is to send, from the port corresponding to the identifier of the first port, the first link discovery packet encapsulated with the label at the outer layer; and encapsulating, by the first node according to the flow entry, the label at the outer layer of the first link discovery packet to form the second link discovery packet, and sending the second link discovery packet from the first port to the second node.

With reference to the first aspect or the first possible implementation manner of the first aspect, in a second possible implementation manner of the first aspect, the method further includes:

sending, by the second controller, a third message to the first controller, where the third message carries the identifier of the first port of the first node and the identifier of the second port of the second node, and is used for indicating that one link exists between the first port of the first node and the second port of the second node.

With reference to the second possible implementation manner of the first aspect, in a third possible implementation manner of the first aspect, the method further includes:

receiving, by the second controller, an identifier of the second node sent by the second node and a port identifier and a port type on the second node; and acquiring, by the second controller, a link type of the link according to the port type, where the third message further includes the link type of the link.

With reference to the second possible implementation manner of the first aspect or the third possible implementation manner of the first aspect, in a fourth possible implementation manner of the first aspect, the method includes that:

the first controller is a transport network controller, the second controller is a routing controller, and the second controller is a controller in a second domain in which the second node is located; and the third message further carries an identifier of the second domain, and the third message is used for indicating that one link exists between the first port of the first node and the second port of the second node in the second domain.

With reference to the first aspect or the first possible implementation manner of the first aspect, in a fifth possible implementation manner of the first aspect, the first controller is a routing controller, the second controller is a transport network controller, the first controller is a controller in a first domain in which the first node is located, and the method includes that:

the first link discovery packet further includes an identifier of the first domain; and the extracting, by the second controller, the identifier of the first port in the first link discovery packet and the identifier of the second port in the second message, and determining that a link exists between the first port of the first node and the second port of the second node specifically includes:

extracting, by the second controller, the identifier of the first domain and the identifier of the first port in the first link discovery packet and the identifier of the second port in the second message, and determining that a link exists between the first port of the first node in the first domain and the second port of the second node.

With reference to the fifth possible implementation manner of the first aspect, in a sixth possible implementation manner of the first aspect, the method further includes:

sending, by the first controller to the second controller by using a control channel, the identifier of the first domain in which the first controller is located; and determining, by the second controller according to the identifier of the first domain in the first link discovery packet, that the first node is controlled by the first controller, and sending a third message to the first controller, where the third message carries the identifier of the first port of the first node and the identifier of the second port of the second node, and is used for indicating that one link exists between the first port of the first node and the second port of the second node.

According to a second aspect, a link discovery method is provided, where the method includes:

receiving, by a second controller, a second message sent by a second node, where the second message carries a second link discovery packet and an identifier of a second port at which the second node receives the second link discovery packet;

popping, by the second controller, a label at an outer layer of the second link discovery packet, to obtain a first link discovery packet, where the first link discovery packet includes an identifier of a first port; and extracting, by the second controller, the identifier of the first port in the first link discovery packet and the identifier of the second port in the second message, and determining that a link exists between the first port of the first node and the second port of the second node, where the second message is a message sent by the second node to the second controller according to the label after the second node receives the second link discovery packet sent by the first node;

the second link discovery packet is a packet formed by encapsulating, by the first node, the label at an outer layer of the first link discovery packet after the first node receives a first message, and the second link discovery packet is sent by the first node from the first port to the second node; and the first message is a message sent by a first controller to the first node, the first message carries the first link discovery packet and the label corresponding to the first link discovery packet, and the label is used for instructing the second node to send the first link discovery packet to the second controller.

With reference to the second aspect, in a first possible implementation manner of the second aspect, that the second link discovery packet is a packet formed by encapsulating, by the first node, the label at an outer layer of the first link discovery packet after the first node receives a first message, and the second link discovery packet is sent by the first node from the first port to the second node specifically includes that:

the second link discovery packet is a packet formed by creating, by the first node, a flow entry after the first node receives the first message and encapsulating, according to the flow entry, the label at the outer layer of the first link discovery packet, and the second link discovery packet is sent by the first node from the first port to the second node according to the flow entry, where the flow entry includes at least: the identifier of the first port, the label, and a forwarding rule, and the forwarding rule is to send, from the port corresponding to the identifier of the first port, the first link discovery packet encapsulated with the label at the outer layer.

With reference to the second aspect or the first possible implementation manner of the second aspect, in a second possible implementation manner of the second aspect, the method further includes:

sending, by the second controller, a third message to the first controller, where the third message carries the identifier of the first port of the first node and the identifier of the second port of the second node, and is used for indicating that one link exists between the first port of the first node and the second port of the second node.

With reference to the second possible implementation manner of the second aspect, in a third possible implementation manner of the second aspect, the method further includes:

receiving, by the second controller, an identifier of the second node sent by the second node and a port identifier and a port type on the second node; and acquiring, by the second controller, a link type of the link according to the port type, where the third message further includes the link type of the link.

With reference to the second possible implementation manner of the second aspect or the third possible implementation manner of the second aspect, in a fourth possible implementation manner of the second aspect, the method includes that:

the first controller is a transport network controller, the second controller is a routing controller, and the second controller is a controller in a second domain in which the second node is located; and the third message further carries an identifier of the second domain, and the third message is used for indicating that one link exists between the first port of the first node and the second port of the second node in the second domain.

With reference to the second aspect or the first possible implementation manner of the second aspect, in a fifth possible implementation manner of the second aspect, the first controller is a routing controller, the second controller is a transport network controller, the first controller is a controller in a first domain in which the first node is located, and the method includes that:

the first link discovery packet further includes an identifier of the first domain; and the extracting, by the second controller, the identifier of the first port in the first link discovery packet and the identifier of the second port in the second message, and determining that a link exists between the first port of the first node and the second port of the second node specifically includes:

extracting, by the second controller, the identifier of the first domain and the identifier of the first port in the first link discovery packet and the identifier of the second port in the second message, and determining that a link exists between the first port of the first node in the first domain and the second port of the second node.

With reference to the fifth possible implementation manner of the second aspect, in a sixth possible implementation manner of the second aspect, the method further includes:

receiving, by the second controller, the identifier of the first domain in which the first controller is located, where the identifier of the first domain is sent by the first controller by using a control channel; and determining, by the second controller according to the identifier of the first domain in the first link discovery packet, that the first node is controlled by the first controller, and sending a third message to the first controller, where the third message carries the identifier of the first port of the first node and the identifier of the second port of the second node, and is used for indicating that one link exists between the first port of the first node and the second port of the second node.

According to a third aspect, a controller is provided, where the controller includes:

a first receiving unit, configured to receive a second message sent by a second node, where the second message carries a second link discovery packet and an identifier of a second port at which the second node receives the second link discovery packet;

a first acquiring unit, configured to pop a label at an outer layer of the second link discovery packet, to obtain a first link discovery packet, where the first link discovery packet includes an identifier of a first port; and an extracting unit, configured to extract the identifier of the first port in the first link discovery packet and the identifier of the second port in the second message, and determine that a link exists between the first port of the first node and the second port of the second node, where the second message is a message sent by the second node to the controller according to the label after the second node receives the second link discovery packet sent by the first node;

the second link discovery packet is a packet formed by encapsulating, by the first node, the label at an outer layer of the first link discovery packet after the first node receives a first message, and the second link discovery packet is sent by the first node from the first port to the second node; and the first message is a message sent by a first controller to the first node, the first message carries the first link discovery packet and the label corresponding to the first link discovery packet, and the label is used for instructing the second node to send the first link discovery packet to the controller.

With reference to the third aspect, in a first possible implementation manner of the third aspect, that the second link discovery packet is a packet formed by encapsulating, by the first node, the label at an outer layer of the first link discovery packet after the first node receives a first message, and the second link discovery packet is sent by the first node from the first port to the second node specifically includes that:

the second link discovery packet is a packet formed by creating, by the first node, a flow entry after the first node receives the first message and encapsulating, according to the flow entry, the label at the outer layer of the first link discovery packet, and the second link discovery packet is sent by the first node from the first port to the second node according to the flow entry, where the flow entry includes at least: the identifier of the first port, the label, and a forwarding rule, and the forwarding rule is to send, from the port corresponding to the identifier of the first port, the first link discovery packet encapsulated with the label at the outer layer.

With reference to the third aspect or the first possible implementation manner of the third aspect, in a second possible implementation manner of the third aspect, the controller further includes:

a sending unit, configured to send a third message to the first controller, where the third message carries the identifier of the first port of the first node and the identifier of the second port of the second node, and is used for indicating that one link exists between the first port of the first node and the second port of the second node.

With reference to the second possible implementation manner of the third aspect, in a third possible implementation manner of the third aspect, the controller further includes:

the first receiving unit, further configured to receive an identifier of the second node sent by the second node and a port identifier and a port type on the second node; and a second acquiring unit, configured to acquire a link type of the link according to the port type, where the third message further includes the link type of the link.

With reference to the second possible implementation manner of the third aspect or the third possible implementation manner of the third aspect, in a fourth possible implementation manner of the third aspect, the first controller is a transport network controller, the controller is a routing controller, and the controller is a controller in a second domain in which the second node is located; and the third message further carries an identifier of the second domain, and the third message is used for indicating that one link exists between the first port of the first node and the second port of the second node in the second domain.

With reference to the third aspect or the first possible implementation manner of the third aspect, in a fifth possible implementation manner of the third aspect, the first controller is a routing controller, the controller is a transport network controller, the first controller is a controller in a first domain in which the first node is located, and the first link discovery packet further includes an identifier of the first domain; and the extracting unit is specifically configured to:

extract the identifier of the first domain and the identifier of the first port in the first link discovery packet and the identifier of the second port in the second message, and determine that a link exists between the first port of the first node in the first domain and the second port of the second node.

With reference to the fifth possible implementation manner of the third aspect, in a sixth possible implementation manner of the third aspect, the controller further includes:

a second receiving unit, configured to receive the identifier of the first domain in which the first controller is located, where the identifier of the first domain is sent by the first controller by using a control channel; and a sending unit, configured to determine, according to the identifier of the first domain in the first link discovery packet, that the first node is controlled by the first controller, and send a third message to the first controller, where the third message carries the identifier of the first port of the first node and the identifier of the second port of the second node, and is used for indicating that one link exists between the first port of the first node and the second port of the second node.

According to a fourth aspect, a link discovery system is provided, where the system includes: a first controller, a first node, a second node, and a second controller, and the second controller is the controller according to any one of the third aspect or the first, second, third, fourth, fifth, and sixth possible implementation manner of the third aspect, where the first controller sends a first message to the first node, where the first message carries a first link discovery packet and a label corresponding to the first link discovery packet, the first link discovery packet includes an identifier of a first port, and the label is used for instructing the second node to send the first link discovery packet to the second controller;

the first node receives the first message, encapsulates the label at an outer layer of the first link discovery packet to form a second link discovery packet, and sends the second link discovery packet from the first port to the second node; and the second node receives the second link discovery packet at a second port, and sends a second message to the second controller according to the label, where the second message carries the second link discovery packet and an identifier of the second port.

With reference to the fourth aspect, in a first possible implementation manner of the fourth aspect, that the first node receives the first message, encapsulates the label at an outer layer of the first link discovery packet to form a second link discovery packet, and sends the second link discovery packet from the first port to the second node specifically includes that:

the first node receives the first message, and creates a flow entry, where the flow entry includes at least: the identifier of the first port, the label, and a forwarding rule, and the forwarding rule is to send, from the port corresponding to the identifier of the first port, the first link discovery packet encapsulated with the label at the outer layer; and the first node encapsulates, according to the flow entry, the label at the outer layer of the first link discovery packet to form the second link discovery packet, and sends the second link discovery packet from the first port to the second node.

Compared with the prior art, the present invention provides the link discovery method. According to the method, the first controller sends the first message to the first node, and the first node receives the first message, encapsulates the label at the outer layer of the first link discovery packet to form the second link discovery packet, and sends the second link discovery packet from the first port to the second node; the second node receives the second link discovery packet at the second port, and sends the second message to the second controller according to the label, where the second message carries the second link discovery packet and the identifier of the second port; and the second controller receives the second message, pops the label of the second link discovery packet to obtain the first link discovery packet, extracts the identifier of the first port in the first link discovery packet and the identifier of the second port in the second message, and determines that a link exists between the first port of the first node and the second port of the second node. In this way, it is implemented that a routing controller and a transport network controller can automatically discover information about a cross-layer link, so that manual configuration is reduced, implementation is simple, and reliability is high.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer and more comprehensible, the following describes the present invention in further detail with reference to the accompanying drawings and embodiments. It should be understood that the specific embodiments described herein are merely used to explain the present invention but are not intended to limit the present invention.

The following descriptions are merely exemplary embodiments of the present invention, but are not intended to limit the present invention. Any modification, equivalent replacement, and improvement made without departing from the spirit and principle of the present invention shall fall within the protection scope of the present invention.

Figure 1:
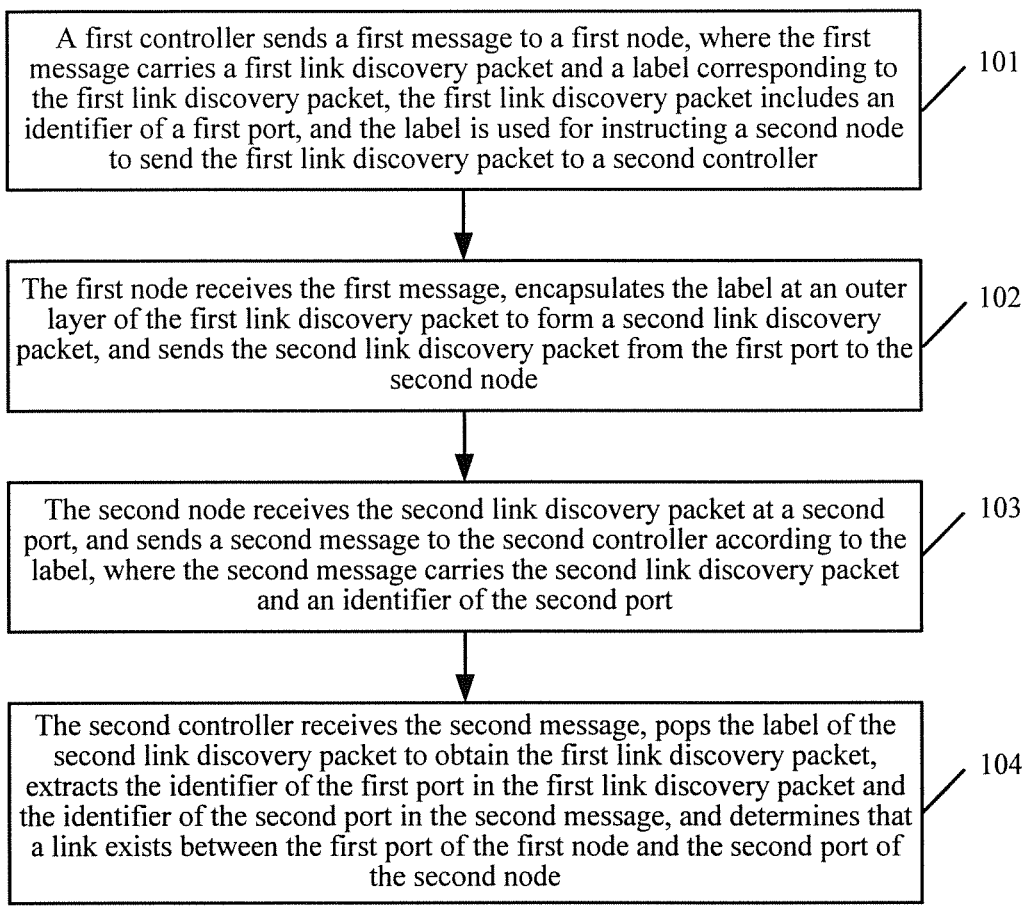
FIG. 1 is a flowchart of a link discovery method according to an embodiment of the present invention.

A process of a link discovery method in an embodiment of the present invention is shown in FIG. 1, and the method includes the following steps:

Step 101: A first controller sends a first message to a first node, where the first message carries a first link discovery packet and a label corresponding to the first link discovery packet, the first link discovery packet includes an identifier of a first port, and the label is used for instructing a second node to send the first link discovery packet to a second controller.

The first message may be a Packet_out message or a Flow_mod message (mod is an abbreviation of modification) in the OpenFlow protocol. The link discovery packet may include the identifier of the first port, and further, may also include address information of the first node. A port of a node may be identifiedby using a globally unique port identifier, or may be identified by using (node address information+a port identifier).

Figure 2:
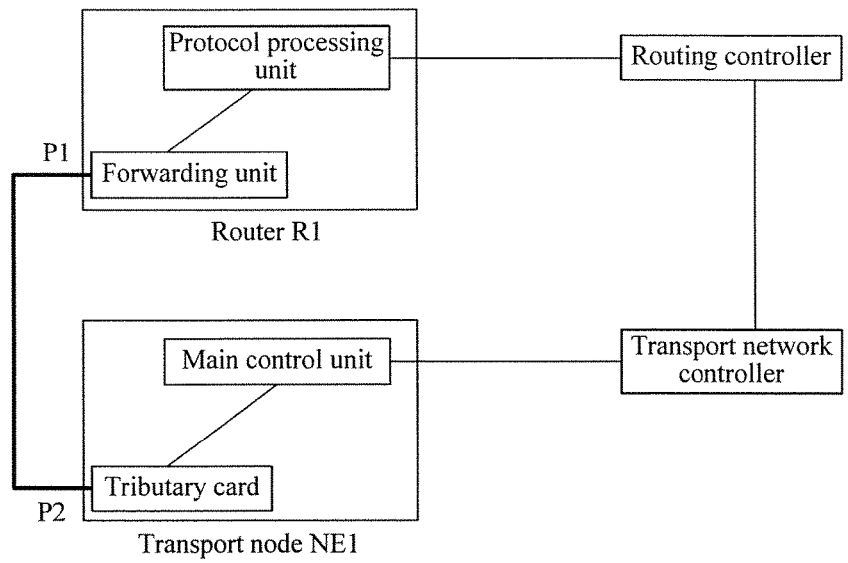
FIG. 2 is a schematic diagram of the link discovery method according to this embodiment of the present invention.

Referring to FIG. 2, FIG. 2 is a schematic diagram of a link discovery method according to an embodiment of the present invention. As shown in FIG. 2, optionally, in a network initialization stage, a control channel may be created between a transport network controller and a routing controller, for example, by means of manual configuration. A transport node reports address information of the transport node and port information on the node, for example, an ID of a port P2, to the transport network controller, and additionally, may further report a type of the port, for example, an Ethernet port or an MPLS port. A router reports address information of the router and port information on the router, for example, an ID of a port P1, to the routing controller, and additionally, may further report a type of the port, for example, an Ethernet port or an MPLS port.

Step 102: The first node receives the first message, encapsulates the label at an outer layer of the first link discovery packet to form a second link discovery packet, and sends the second link discovery packet from the first port to the second node.

The step may specifically include:

receiving, by the first node, the first message, and creating a flow entry, where the flow entry includes at least: the identifier of the first port, the label, and a forwarding rule, and the forwarding rule is to send, from the port corresponding to the identifier of the first port, the first link discovery packet encapsulated with the label at the outer layer; and encapsulating, by the first node according to the flow entry, the label at the outer layer of the first link discovery packet to form the second link discovery packet, and sending the second link discovery packet from the first port to the second node.

Step 103: The second node receives the second link discovery packet at a second port, and sends a second message to the second controller according to the label, where the second message carries the second link discovery packet and an identifier of the second port.

Step 104: The second controller receives the second message, pops the label of the second link discovery packet to obtain the first link discovery packet, extracts the identifier of the first port in the first link discovery packet and the identifier of the second port in the second message, and determines that a link exists between the first port of the first node and the second port of the second node.

Optionally, after step S104, the method further includes:

sending, by the second controller, a third message to the first controller, where the third message carries the identifier of the first port of the first node and the identifier of the second port of the second node, and is used for indicating that one link exists between the first port of the first node and the second port of the second node.

Optionally, the method further includes:

receiving, by the second controller, an identifier of the second node sent by the second node and a port identifier and a port type on the second node; and acquiring, by the second controller, a link type of the link according to the port type, where the third message further includes the link type of the link.

Specifically, the first controller is a transport network controller, the second controller is a routing controller, and the second controller is a controller in a second domain in which the second node is located. Optionally, if there are multiple routing controllers, the method may further include that:

the third message further carries an identifier of the second domain, and the third message is used for indicating that one link exists between the first port of the first node and the second port of the second node in the second domain.

Specifically, the first controller is a routing controller, the second controller is a transport network controller, the first controller is a controller in a first domain in which the first node is located, and the method includes that:

the first link discovery packet further includes an identifier of the first domain; and the extracting, by the second controller, the identifier of the first port in the first link discovery packet and the identifier of the second port in the second message, and determining that a link exists between the first port of the first node and the second port of the second node specifically includes:

extracting, by the second controller, the identifier of the first domain and the identifier of the first port in the first link discovery packet and the identifier of the second port in the second message, and determining that a link exists between the first port of the first node in the first domain and the second port of the second node.

The method further includes:

sending, by the first controller to the second controller by using a control channel, the identifier of the first domain in which the first controller is located; and determining, by the second controller according to the identifier of the first domain in the first link discovery packet, that the first node is controlled by the first controller, and sending a third message to the first controller, where the third message carries the identifier of the first port of the first node and the identifier of the second port of the second node, and is used for indicating that one link exists between the first port of the first node and the second port of the second node.

Figure 4:
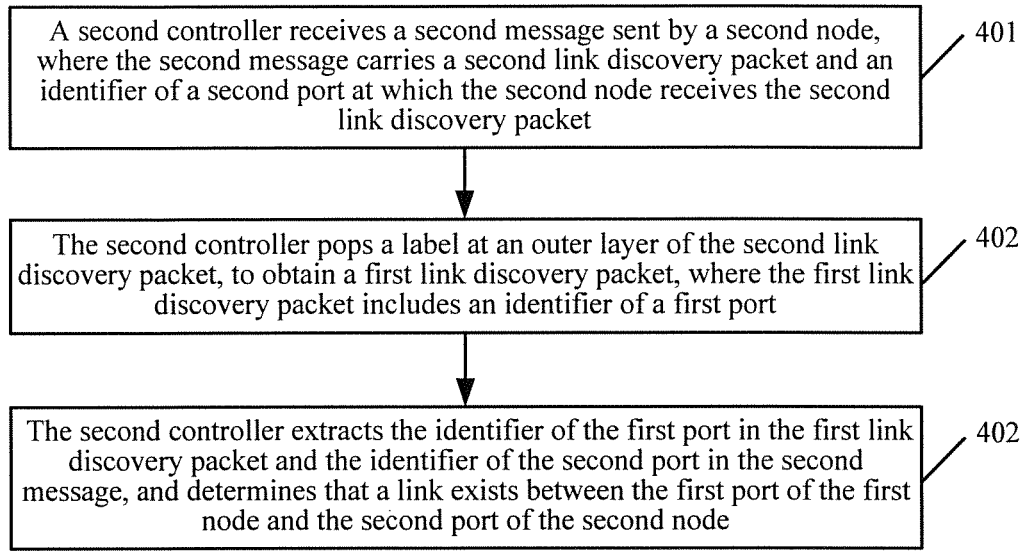
FIG. 4 is a flowchart of a link discovery method according to an embodiment of the present invention.

A process of a link discovery method according to an embodiment of the present invention is shown in FIG. 4, and the method includes:

Step 401: A second controller receives a second message sent by a second node, where the second message carries a second link discovery packet and an identifier of a second port at which the second node receives the second link discovery packet.

The first message may be a Packet_out message or a Flow_mod message (mod is an abbreviation of modification) in the OpenFlow protocol. The link discovery packet may include the identifier of the first port, and further, may also include address information of the first node. A port of a node may be identified by using a globally unique port identifier, or may be identified by using (node address information+a port identifier).

Referring to FIG. 2, FIG. 2 is a schematic diagram of the link discovery method according to this embodiment of the present invention. As shown in FIG. 2, optionally, in a network initialization stage, a control channel may be created between a transport network controller and a routing controller, for example, by means of manual configuration. A transport node reports address information of the transport node and port information on the node, for example, an ID of a port P2, to the transport network controller, and additionally, may further report a type of the port, for example, an Ethernet port or an MPLS port. A router reports address information of the router and port information on the router, for example, an ID of a port P1, to the routing controller, and additionally, may further report a type of the port, for example, an Ethernet port or an MPLS port.

Step 402: The second controller pops a label at an outer layer of the second link discovery packet, to obtain a first link discovery packet, where the first link discovery packet includes an identifier of a first port.

Step 403: The second controller extracts the identifier of the first port in the first link discovery packet and the identifier of the second port in the second message, and determines that a link exists between the first port of the first node and the second port of the second node.

The second message is a message sent by the second node to the second controller according to the label after the second node receives the second link discovery packet sent by the first node.

The second link discovery packet is a packet formed by encapsulating, by the first node, the label at an outer layer of the first link discovery packet after the first node receives a first message, and the second link discovery packet is sent by the first node from the first port to the second node.

Specifically, that the second link discovery packet is a packet formed by encapsulating, by the first node, the label at an outer layer of the first link discovery packet after the first node receives a first message, and the second link discovery packet is sent by the first node from the first port to the second node specifically includes that:

the second link discovery packet is a packet formed by creating, by the first node, a flow entry after the first node receives the first message and encapsulating, according to the flow entry, the label at the outer layer of the first link discovery packet, and the second link discovery packet is sent by the first node from the first port to the second node according to the flow entry, where the flow entry includes at least: the identifier of the first port, the label, and a forwarding rule, and the forwarding rule is to send, from the port corresponding to the identifier of the first port, the first link discovery packet encapsulated with the label at the outer layer.

The first message is a message sent by a first controller to the first node, where the first message carries the first link discovery packet and the label corresponding to the first link discovery packet, and the label is used for instructing the second node to send the first link discovery packet to the second controller.

Specifically, the second link discovery packet is a packet formed by creating, by the first node, a flow entry after the first node receives the first message and encapsulating, according to the flow entry, the label at the outer layer of the first link discovery packet, and the second link discovery packet is sent by the first node from the first port to the second node according to the flow entry, where the flow entry includes at least: the identifier of the first port, the label, and a forwarding rule, and the forwarding rule is to send, from the port corresponding to the identifier of the first port, the first link discovery packet encapsulated with the label at the outer layer.

Optionally, the method further includes:

sending, by the second controller, a third message to the first controller, where the third message carries the identifier of the first port of the first node and the identifier of the second port of the second node, and is used for indicating that one link exists between the first port of the first node and the second port of the second node.

Optionally, the method further includes:

receiving, by the second controller, an identifier of the second node sent by the second node and a port identifier and a port type on the second node; and acquiring, by the second controller, a link type of the link according to the port type, where the third message further includes the link type of the link.

Figure 3:
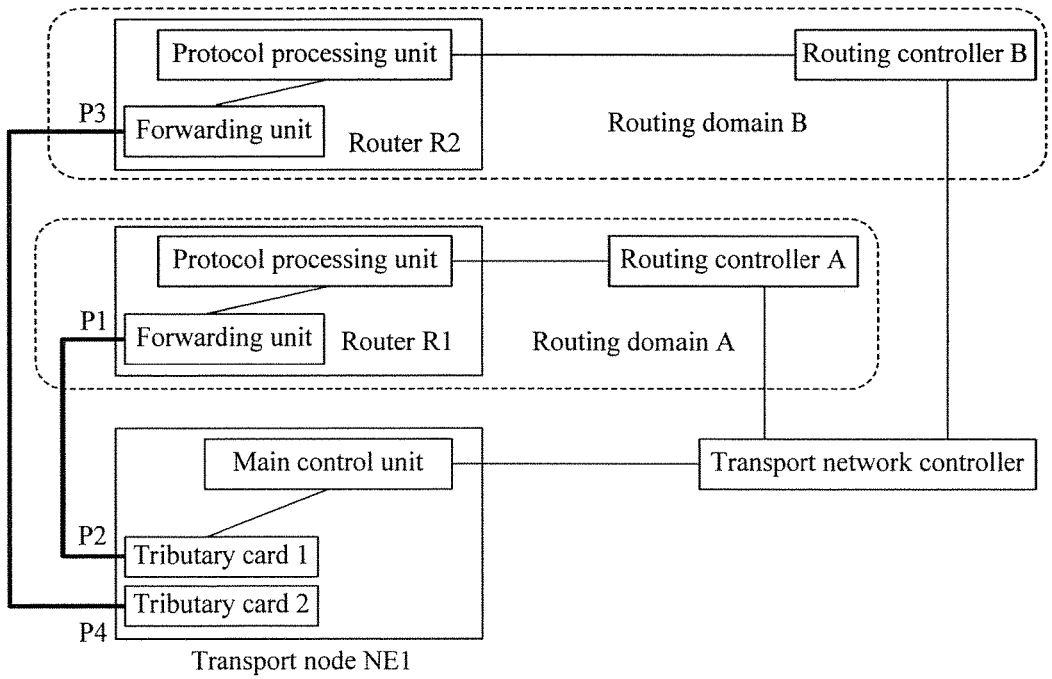
FIG. 3 is a schematic diagram of the link discovery method according to this embodiment of the present invention.

Referring to FIG. 3, FIG. 3 is a schematic diagram of the link discovery method according to this embodiment of the present invention.

Specifically, the first controller is a transport network controller, the second controller is a routing controller, and the second controller is a controller in a second domain in which the second node is located. If there are multiple routing domains, the method may include that:

the third message further carries an identifier of the second domain, and the third message is used for indicating that one link exists between the first port of the first node and the second port of the second node in the second domain.

Specifically, the first controller is a routing controller, the second controller is a transport network controller, and the first controller is a controller in a first domain in which the first node is located. If there are multiple routing domains, the method includes that:

the first link discovery packet further includes an identifier of the first domain; and the extracting, by the second controller, the identifier of the first port in the first link discovery packet and the identifier of the second port in the second message, and determining that a link exists between the first port of the first node and the second port of the second node specifically includes:

extracting, by the second controller, the identifier of the first domain and the identifier of the first port in the first link discovery packet and the identifier of the second port in the second message, and determining that a link exists between the first port of the first node in the first domain and the second port of the second node.

Optionally, the method further includes:

receiving, by the second controller, the identifier of the first domain in which the first controller is located, where the identifier of the first domain is sent by the first controller by using a control channel; and determining, by the second controller according to the identifier of the first domain in the first link discovery packet, that the first node is controlled by the first controller, and sending a third message to the first controller, where the third message carries the identifier of the first port of the first node and the identifier of the second port of the second node, and is used for indicating that one link exists between the first port of the first node and the second port of the second node.

The link discovery method provided in this embodiment of the present invention is described in detail in the following by using a specific routing network and transport network as an example and with reference to the accompanying drawings.

In an embodiment, as shown in FIG. 2, specifically, the first controller is a routing controller, the first node is a router R1, the second node is a transport node NE1, and the second controller is a transport network controller.

The routing controller allocates one unused label to the router R1. For example, a VLAN label may be used in the Ethernet, and an MPLS label may be used in an MPLS network. One link discovery packet is generated for a port of each router, where the packet includes address information of the router R1 and a corresponding port ID. The routing controller sends a first message to the router R1, where the first message packet includes the allocated label and a corresponding link discovery packet, and the flow entry includes at least:

a port identifier ID of the router, the preset label, and a forwarding rule, where the forwarding rule is that the router adds the preset label to the link discovery packet, and forwards, to the transport node from the port of the router corresponding to the port identifier ID of the router, the link discovery packet to which the label is added.

Specifically, the forwarding rule is that: for a link discovery packet whose port is X, the allocated label is added to the packet, and the packet is forwarded from the port X.

After receiving the first message, the router R1 creates a new flow entry in the router, and meanwhile, a protocol processing unit of the router R1 extracts the link discovery packet from the message, and a forwarding unit of the router R1 then forwards the link discovery packet according to the newly created flow entry. For example, the allocated label is pushed on a link discovery packet corresponding to a port P1, and the link discovery packet is forwarded from P1.

After receiving the link discovery packet encapsulated with the label, the transport node NE1 reports the link discovery packet to the transport network controller. Specifically, after receiving, at a port P2, the link discovery packet encapsulated with the label, a tributary card of the transport node NE1 discovers that the label encapsulated at an outer layer of the packet is a newly allocated label, and the node is not configured with a forwarding rule for the label previously; therefore, the packet cannot be forwarded, and the tributary card sends the packet to a main control unit of the transport node NE1. The main control unit sends a second message to the transport network controller, where the second message includes the link discovery packet that cannot be forwarded and is encapsulated with the label, and an address and a port ID P2 of the transport node NE1 that receives the packet.

After receiving the second message, the transport network controller pops the label at the outer layer of the packet, and discovers that the packet is a link discovery packet. The transport network controller further analyzes the link discovery packet, and learns that the packet is sent by the port P1 of the router R1; therefore, the transport network controller learns that one cross-layer link exists between P1 of the router R1 and P2 of the transport node NE1, and may also acquire, according to a port type previously reported by the node, a type of the cross-layer link, for example, an Ethernet link or an MPLS link.

The transport network controller may send a third message to the routing controller, where the third message carries a P1 ID of the router R1 and a P2 ID of the transport device NE1, and indicates that one cross-layer link exists between P1 of the router R1 and P2 of the transport device NE1. The third message may further include a link type, for example, an Ethernet link or an MPLS link.

Specifically, as shown in FIG. 3, there are multiple routing domains. When a routing controller A sends a first message to a router, the first message carries an identifier of a routing domain A; when a routing controller B sends a first message to a router, the first message carries an identifier of a routing domain B.

In another embodiment, specifically, referring to FIG. 2, the first controller is a transport network controller, the first node is a transport node NE1, the second node is a router R1, and the second controller is a routing controller.

The transport network controller creates a flow table for the transport node, and requires the transport node to send a link discovery packet from a port of the transport node according to the created flow table, where the port may be an Ethernet port, an MPLS port, or the like.

The transport network controller allocates one unused label to the transport node NE1. For example, a VLAN label may be used in the Ethernet, and an MPLS label may be used in an MPLS network. One link discovery packet is generated for a port of each transport node. The packet includes address information of the transport node NE1 and a corresponding port ID. The transport network controller sends a flow table (flow table) creation message to the transport node NE1, where the message includes the allocated label and a corresponding link discovery packet.

After the transport node NE1 receives the flow table creation message, a main control unit inside the transport node creates a new flow entry (flow entry), where the entry includes a forwarding rule. Specifically, the forwarding rule is: for a link discovery packet whose port is X, the allocated label is pushed on the packet, and the packet is forwarded from the port X. Meanwhile, the main control unit of the transport node NE1 extracts the link discovery packet from the message, and then forwards the link discovery packet according to the newly created flow entry and the forwarding rule of the flow entry. For example, a tributary card corresponding to a port P2 pushes the allocated label on the link discovery packet, and forwards the link discovery packet from P2.

After receiving the link discovery packet, the router R1 reports the link discovery packet to the routing controller. After receiving, at a port P1, the link discovery packet encapsulated with the label, a forwarding unit of the router R1 discovers that the label encapsulated at an outer layer of the packet is a newly allocated label, and the router is not configured with a forwarding rule for the label previously; therefore, the packet cannot be forwarded. The forwarding unit submits the packet to a protocol processing unit of the router R1. The protocol processing unit sends a second message to the routing controller, where the second message includes the received link discovery packet that cannot be forwarded and is encapsulated with the label, and receives an address and a port ID P1 of the router R1 of the packet.

After receiving the second message, the routing controller pops the label at the outer layer of the packet, and discovers that the packet is a link discovery packet. The routing controller further analyzes the link discovery packet, and learns that the packet is sent by the port P2 of the transport node NE1; therefore, the routing controller learns that one cross-layer link exists between P1 of the router R1 and P2 of the transport device NE1, and may also acquire, according to a port type previously reported by the node, a type of the cross-layer link, for example, an Ethernet link or an MPLS link.

The routing controller may send a third message to the transport network controller, where the third message carries a P1 ID of the router R1 and a P2 ID of the transport device NE1, and indicates that one cross-layer link exists between P1 of the router R1 and P2 of the transport device NE1. The third message may further include a link type.

Specifically, referring to FIG. 3, FIG. 3 is a schematic diagram of the link discovery method according to this embodiment of the present invention. If there are multiple routing domains, a routing controller A sends a third message to a transport network controller, where the third message may further carry an identifier of a routing domain A, and the third message is used for indicating that one cross-layer link exists between P2 of a transport device NE1 and P1 of a router R1 in the routing domain A.

This embodiment of the present invention provides the link discovery method. According to the method, the first controller sends the first message to the first node, and the first node receives the first message, encapsulates the label at the outer layer of the first link discovery packet to form the second link discovery packet, and sends the second link discovery packet from the first port to the second node; the second node receives the second link discovery packet at the second port, and sends the second message to the second controller according to the label, where the second message carries the second link discovery packet and the identifier of the second port; and the second controller receives the second message, pops the label of the second link discovery packet to obtain the first link discovery packet, extracts the identifier of the first port in the first link discovery packet and the identifier of the second port in the second message, and determines that a link exists between the first port of the first node and the second port of the second node. In this way, it is implemented that a routing controller and a transport network controller can automatically discover information about a cross-layer link, so that manual configuration is reduced.

Figure 5:
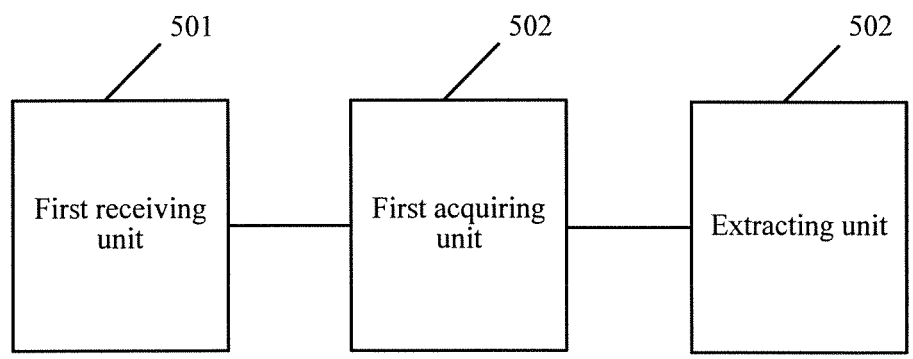
FIG. 5 is an apparatus structural diagram of a controller according to an embodiment of the present invention.

Referring to FIG. 5, FIG. 5 is an apparatus structural diagram of a controller according to an embodiment of the present invention. As shown in FIG. 5, the controller includes:

a first receiving unit 501, configured to receive a second message sent by a second node, where the second message carries a second link discovery packet and an identifier of a second port at which the second node receives the second link discovery packet;

a first acquiring unit 502, configured to pop a label at an outer layer of the second link discovery packet, to obtain a first link discovery packet, where the first link discovery packet includes an identifier of a first port; and an extracting unit 503, configured to extract the identifier of the first port in the first link discovery packet and the identifier of the second port in the second message, and determine that a link exists between the first port of the first node and the second port of the second node, where the second message is a message sent by the second node to the controller according to the label after the second node receives the second link discovery packet sent by the first node; and the second link discovery packet is a packet formed by encapsulating, by the first node, the label at an outer layer of the first link discovery packet after the first node receives a first message, and the second link discovery packet is sent by the first node from the first port to the second node.

Specifically, the step may include that:

the second link discovery packet is a packet formed by creating, by the first node, a flow entry after the first node receives the first message and encapsulating, according to the flow entry, the label at the outer layer of the first link discovery packet, and the second link discovery packet is sent by the first node from the first port to the second node according to the flow entry, where the flow entry includes at least: the identifier of the first port, the label, and a forwarding rule, and the forwarding rule is to send, from the port corresponding to the identifier of the first port, the first link discovery packet encapsulated with the label at the outer layer.

The first message is a message sent by a first controller to the first node, where the first message carries the first link discovery packet and the label corresponding to the first link discovery packet, and the label is used for instructing the second node to send the first link discovery packet to the controller.

Optionally, the controller further includes:

a sending unit, configured to send a third message to the first controller, where the third message carries the identifier of the first port of the first node and the identifier of the second port of the second node, and is used for indicating that one link exists between the first port of the first node and the second port of the second node.

Optionally, the controller further includes:

the first receiving unit, further configured to receive an identifier of the second node sent by the second node and a port identifier and a port type on the second node; and a second acquiring unit, configured to acquire a link type of the link according to the port type, where the third message further includes the link type of the link.

Specifically, the first controller is a transport network controller, the second controller is a routing controller, and the second controller is a controller in a second domain in which the second node is located; and the third message may further carry an identifier of the second domain, and the third message is used for indicating that one link exists between the first port of the first node and the second port of the second node in the second domain.

Specifically, the first controller is a routing controller, the second controller is a transport network controller, the first controller is a controller in a first domain in which the first node is located, and the first link discovery packet further includes an identifier of the first domain; and the extracting unit is specifically configured to:

extract the identifier of the first domain and the identifier of the first port in the first link discovery packet and the identifier of the second port in the second message, and determine that a link exists between the first port of the first node in the first domain and the second port of the second node.

Optionally, the controller further includes:

a second receiving unit, configured to receive the identifier of the first domain in which the first controller is located, where the identifier of the first domain is sent by the first controller by using a control channel; and a sending unit, configured to determine, according to the identifier of the first domain in the first link discovery packet, that the first node is controlled by the first controller, and send a third message to the first controller, where the third message carries the identifier of the first port of the first node and the identifier of the second port of the second node, and is used for indicating that one link exists between the first port of the first node and the second port of the second node.

Figure 7:
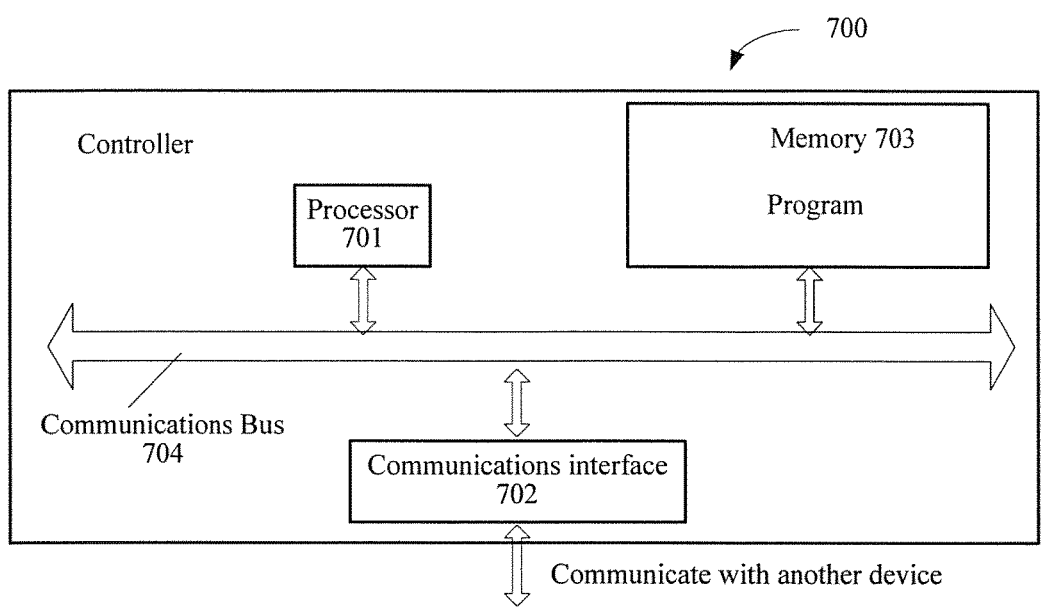
FIG. 7 is an apparatus structural diagram of a controller according to an embodiment of the present invention.

Referring to FIG. 7, FIG. 7 is an apparatus structural diagram of a controller according to an embodiment of the present invention. Specific implementation of the controller is not limited in a specific embodiment of the present invention. The controller 700 includes:

a processor 701, a communications interface 702, a memory 703, and a bus 704.

The processor 701, the communications interface 702, and the memory 703 communicate with each other by using the bus 704.

The communications interface 702 is configured to communicate with another device.

The processor 701 is configured to execute a program.

Specifically, the program may include program code, where the program code includes a computer operation instruction.

The processor 701 may be a central processing unit (CPU), or an application specific integrated circuit ASIC (Application Specific Integrated Circuit), or one or more integrated circuits configured to implement this embodiment of the present invention.

The memory 703 is configured to store the program. The memory 703 may be a volatile memory, for example, a random-access memory (random-access memory, RAN), or a non-volatile memory, for example, a read-only memory (read-only memory, ROM), a flash memory, a hard disk drive (hard disk drive, HDD), or a solid-state drive (SSD). The processor 701 executes the following method according to a program instruction stored in the memory 703:

receiving a second message sent by a second node, where the second message carries a second link discovery packet and an identifier of a second port at which the second node receives the second link discovery packet;

popping a label at an outer layer of the second link discovery packet, to obtain a first link discovery packet, where the first link discovery packet includes an identifier of a first port; and extracting the identifier of the first port in the first link discovery packet and the identifier of the second port in the second message, and determining that a link exists between the first port of the first node and the second port of the second node, where the second message is a message sent by the second node to the controller according to the label after the second node receives the second link discovery packet sent by the first node;

the second link discovery packet is a packet formed by encapsulating, by the first node, the label at an outer layer of the first link discovery packet after the first node receives a first message, and the second link discovery packet is sent by the first node from the first port to the second node; and the step may specifically include that:

the second link discovery packet is a packet formed by creating, by the first node, a flow entry after the first node receives the first message and encapsulating, according to the flow entry, the label at the outer layer of the first link discovery packet, and the second link discovery packet is sent by the first node from the first port to the second node according to the flow entry, where the flow entry includes at least: the identifier of the first port, the label, and a forwarding rule, and the forwarding rule is to send, from the port corresponding to the identifier of the first port, the first link discovery packet encapsulated with the label at the outer layer.

The first message is a message sent by a first controller to the first node, where the first message carries the first link discovery packet and the label corresponding to the first link discovery packet, and the label is used for instructing the second node to send the first link discovery packet to the second controller.

The method further includes:

sending a third message to the first controller, where the third message carries the identifier of the first port of the first node and the identifier of the second port of the second node, and is used for indicating that one link exists between the first port of the first node and the second port of the second node.

The method further includes:

receiving an identifier of the second node sent by the second node and a port identifier and a port type on the second node; and acquiring a link type of the link according to the port type, where the third message further includes the link type of the link.

The method includes:

Specifically, the first controller is a transport network controller, the controller is a routing controller, and the controller is a controller in a second domain in which the second node is located; and the third message further carries an identifier of the second domain, and the third message is used for indicating that one link exists between the first port of the first node and the second port of the second node in the second domain.

Alternatively, specifically, the first controller is a routing controller, the controller is a transport network controller, the first controller is a controller in a first domain in which the first node is located, and the method includes that:

the first link discovery packet further includes an identifier of the first domain; and the extracting the identifier of the first port in the first link discovery packet and the identifier of the second port in the second message, and determining that a link exists between the first port of the first node and the second port of the second node specifically includes:

extracting the identifier of the first domain and the identifier of the first port in the first link discovery packet and the identifier of the second port in the second message, and determining that a link exists between the first port of the first node in the first domain and the second port of the second node.

The method further includes:

receiving the identifier of the first domain in which the first controller is located, where the identifier of the first domain is sent by the first controller by using a control channel; and determining, according to the identifier of the first domain in the first link discovery packet, that the first node is controlled by the first controller, and sending a third message to the first controller, where the third message carries the identifier of the first port of the first node and the identifier of the second port of the second node, and is used for indicating that one link exists between the first port of the first node and the second port of the second node.

The foregoing embodiment of the present invention provides the controller. The first controller sends the first message to the first node, and the first node receives the first message, encapsulates the label at the outer layer of the first link discovery packet to form the second link discovery packet, and sends the second link discovery packet from the first port to the second node; the second node receives the second link discovery packet at the second port, and sends the second message to the second controller according to the label, where the second message carries the second link discovery packet and the identifier of the second port; and the second controller receives the second message, pops the label of the second link discovery packet to obtain the first link discovery packet, extracts the identifier of the first port in the first link discovery packet and the identifier of the second port in the second message, and determines that a link exists between the first port of the first node and the second port of the second node. In this way, it is implemented that a routing controller and a transport network controller can automatically discover information about a cross-layer link, so that manual configuration is reduced.

For the controller in the foregoing embodiment, content such as information exchange and execution processes among units in the controller is based on a same concept as the method embodiments of the present invention; therefore, for specific content, reference may be made to the description in the method embodiments of the present invention, and no further details are provided herein.

Figure 6:
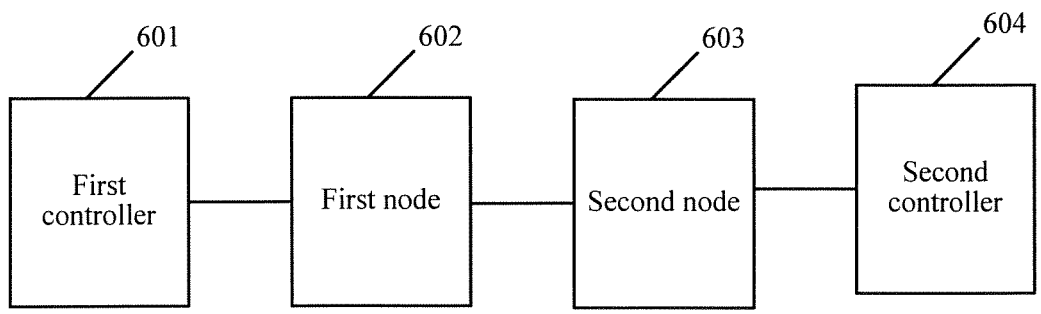
FIG. 6 is an apparatus structural diagram of a system according to an embodiment of the present invention.

Referring to FIG. 6, FIG. 6 is a structural diagram of a link discovery system according to an embodiment of the present invention. As shown in FIG. 6, the system includes:

a first controller 601, a first node 602, a second node 603, and a second controller 604, where the second controller 604 may be the controller in the apparatus embodiment corresponding to FIG. 5 or FIG. 7 in the foregoing.

The first controller 601 sends a first message to the first node 602, where the first message carries a first link discovery packet and a label corresponding to the first link discovery packet, the first link discovery packet includes an identifier of a first port, and the label is used for instructing the second node to send the first link discovery packet to the second controller.

The first node 602 receives the first message, encapsulates the label at an outer layer of the first link discovery packet to form a second link discovery packet, and sends the second link discovery packet from the first port to the second node 603.

The second node 603 receives the second link discovery packet at a second port, and sends a second message to the second controller according to the label, where the second message carries the second link discovery packet and an identifier of the second port.

Specifically, that the first node 602 receives the first message, encapsulates the label at an outer layer of the first link discovery packet to form a second link discovery packet, and sends the second link discovery packet from the first port to the second node 603 specifically includes that:

the first node 602 receives the first message, and creates a flow entry, where the flow entry includes at least: the identifier of the first port, the label, and a forwarding rule, and the forwarding rule is to send, from the port corresponding to the identifier of the first port, the first link discovery packet encapsulated with the label at the outer layer; and the first node 602 encapsulates, according to the flow entry, the label at the outer layer of the first link discovery packet to form the second link discovery packet, and sends the second link discovery packet from the first port to the second node 603.

This embodiment of the present invention provides the link discovery system. According to the system, the first controller sends the first message to the first node, and the first node receives the first message, encapsulates the label at the outer layer of the first link discovery packet to form the second link discovery packet, and sends the second link discovery packet from the first port to the second node; the second node receives the second link discovery packet at the second port, and sends the second message to the second controller according to the label, where the second message carries the second link discovery packet and the identifier of the second port; and the second controller receives the second message, pops the label of the second link discovery packet to obtain the first link discovery packet, extracts the identifier of the first port in the first link discovery packet and the identifier of the second port in the second message, and determines that a link exists between the first port of the first node and the second port of the second node. In this way, it is implemented that a routing controller and a transport network controller can automatically discover information about a cross-layer link, so that manual configuration is reduced.

For the link discovery system in the foregoing embodiment, content such as information exchange and execution processes among nodes in the link discovery system is based on a same concept as the method embodiments and the apparatus embodiments of the present invention; therefore, for specific content, reference may be made to the description in the method embodiments and the apparatus embodiments of the present invention, and no further details are provided herein.

A person of ordinary skill in the art may understand that all or some of the steps of the method in the foregoing embodiments may be implemented by a computer program instructing relevant hardware. The program may be stored in a computer-readable storage medium. When the program runs, the processes of the method in the foregoing embodiments are performed. The storage medium may include: a magnetic disk, an optical disc, a read-only memory (Read-Only Memory, ROM), or a random access memory (Random Access Memory, RAM).

The foregoing descriptions are merely exemplary implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A link discovery method, wherein the method comprises:
    sending, by a first controller, a first message to a first node, wherein the first message carries a first link discovery packet and a label corresponding to the first link discovery packet, the first link discovery packet comprises an identifier of a first port, and the label is used for instructing a second node to send the first link discovery packet to a second controller;
    receiving, by the first node, the first message, encapsulating the label at an outer layer of the first link discovery packet to form a second link discovery packet, and sending the second link discovery packet from the first port to the second node;
    receiving, by the second node, the second link discovery packet at a second port, and sending a second message to the second controller according to the label, wherein the second message carries the second link discovery packet and an identifier of the second port; and
    receiving, by the second controller, the second message, popping the label of the second link discovery packet to obtain the first link discovery packet, extracting the identifier of the first port in the first link discovery packet and the identifier of the second port in the second message, and determining that a link exists between the first port of the first node and the second port of the second node.

2. The method according to claim 1, wherein receiving the first message, encapsulating the label at an outer layer of the first link discovery packet to form a second link discovery packet, and sending the second link discovery packet from the first port to the second node comprises:
    receiving, by the first node, the first message, and creating a flow entry, wherein the flow entry comprises: the identifier of the first port, the label, and a forwarding rule, and the forwarding rule is to send, from the port corresponding to the identifier of the first port, the first link discovery packet encapsulated with the label at the outer layer; and
    encapsulating, by the first node according to the flow entry, the label at the outer layer of the first link discovery packet to form the second link discovery packet, and sending the second link discovery packet from the first port to the second node.

3. The method according to claim 1, wherein the method further comprises:
    sending, by the second controller, a third message to the first controller, wherein the third message carries the identifier of the first port of the first node and the identifier of the second port of the second node, and is used for indicating that one link exists between the first port of the first node and the second port of the second node.

4. The method according to claim 3, wherein the method further comprises:
receiving, by the second controller, an identifier of the second node sent by the second node and a port identifier and a port type on the second node; and
acquiring, by the second controller, a link type of the link according to the port type, wherein
the third message further comprises the link type of the link.

5. The method according to claim 3, wherein:
the first controller is a transport network controller, the second controller is a routing controller, and the second controller is a controller in a second domain in which the second node is located; and
the third message further carries an identifier of the second domain, and the third message is used for indicating that one link exists between the first port of the first node and the second port of the second node in the second domain.

6. The method according to claim 1, wherein the first controller is a routing controller, the second controller is a transport network controller, the first controller is a controller in a first domain in which the first node is located, and the method comprises that:
the first link discovery packet further comprises an identifier of the first domain; and
extracting the identifier of the first port in the first link discovery packet and the identifier of the second port in the second message, and determining that a link exists between the first port of the first node and the second port of the second node comprises:
extracting, by the second controller, the identifier of the first domain and the identifier of the first port in the first link discovery packet and the identifier of the second port in the second message, and determining that a link exists between the first port of the first node in the first domain and the second port of the second node.

7. The method according to claim 6, wherein the method further comprises:
sending, by the first controller to the second controller by using a control channel, the identifier of the first domain in which the first controller is located; and
determining, by the second controller according to the identifier of the first domain in the first link discovery packet, that the first node is controlled by the first controller, and sending a third message to the first controller, wherein the third message carries the identifier of the first port of the first node and the identifier of the second port of the second node, and is used for indicating that one link exists between the first port of the first node and the second port of the second node.

8. A controller, comprising:
a memory element for storing data; and
a processor that executes instructions associated with the data, wherein the processor and the memory element cooperate such that the controller is configured for:
receiving a second message sent by a second node, wherein the second message carries a second link discovery packet and an identifier of a second port at which the second node receives the second link discovery packet;
popping a label at an outer layer of the second link discovery packet, to obtain a first link discovery packet, wherein the first link discovery packet comprises an identifier of a first port; and
extracting the identifier of the first port in the first link discovery packet and the identifier of the second port in the second message, and determining that a link exists between the first port of the first node and the second port of the second node, wherein
the second message is a message sent by the second node to the controller according to the label after the second node receives the second link discovery packet sent by the first node;
the second link discovery packet is a packet formed by encapsulating, by the first node, the label at an outer layer of the first link discovery packet after the first node receives a first message, and the second link discovery packet is sent by the first node from the first port to the second node; and
the first message is a message sent by a first controller to the first node, the first message carries the first link discovery packet and the label corresponding to the first link discovery packet, and the label is used for instructing the second node to send the first link discovery packet to the controller.

9. The controller according to claim 8, wherein that the second link discovery packet is a packet formed by encapsulating, by the first node, the label at an outer layer of the first link discovery packet after the first node receives a first message, and the second link discovery packet is sent by the first node from the first port to the second node comprises that:
the second link discovery packet is a packet formed by creating, by the first node, a flow entry after the first node receives the first message and encapsulating, according to the flow entry, the label at the outer layer of the first link discovery packet, and the second link discovery packet is sent by the first node from the first port to the second node according to the flow entry, wherein
the flow entry comprises: the identifier of the first port, the label, and a forwarding rule, and the forwarding rule is to send, from the port corresponding to the identifier of the first port, the first link discovery packet encapsulated with the label at the outer layer.

10. The controller according to claim 8, wherein the controller is further configured for:
sending a third message to the first controller, wherein the third message carries the identifier of the first port of the first node and the identifier of the second port of the second node, and is used for indicating that one link exists between the first port of the first node and the second port of the second node.

11. The controller according to claim 10, wherein the controller is further configured for:
receiving an identifier of the second node sent by the second node and a port identifier and a port type on the second node; and
acquiring a link type of the link according to the port type, wherein
the third message further comprises the link type of the link.

12. The controller according to claim 10, wherein the first controller is a transport network controller, the controller is a routing controller, and the controller is a controller in a second domain in which the second node is located; and
the third message further carries an identifier of the second domain, and the third message is used for indicating that one link exists between the first port of the first node and the second port of the second node in the second domain.

* * * * *